(12) United States Patent
Song et al.

(10) Patent No.: US 10,484,683 B2
(45) Date of Patent: Nov. 19, 2019

(54) IMAGE PROCESSING METHOD AND APPARATUS

(71) Applicant: Huawei Technologies Co., Ltd., Shenzhen (CN)

(72) Inventors: Jin Song, Beijing (CN); Yin Zhao, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 148 days.

(21) Appl. No.: 15/841,810

(22) Filed: Dec. 14, 2017

(65) Prior Publication Data

US 2018/0109792 A1 Apr. 19, 2018

Related U.S. Application Data

(63) Continuation of application No. PCT/CN2015/085142, filed on Jul. 27, 2015.

(51) Int. Cl.
*G06K 9/00* (2006.01)
*H04N 19/119* (2014.01)
*H04N 19/146* (2014.01)
*H04N 19/174* (2014.01)
(Continued)

(52) U.S. Cl.
CPC ......... *H04N 19/119* (2014.11); *G06F 9/5027* (2013.01); *H04N 19/146* (2014.11); *H04N 19/174* (2014.11); *H04N 19/176* (2014.11)

(58) Field of Classification Search
CPC ...... H04N 19/119; H04N 19/46; H04N 19/20; H04N 19/51; H04N 19/176; H04N 19/146; H04N 19/174; H04N 19/164; G06F 9/5027
See application file for complete search history.

(56) References Cited

U.S. PATENT DOCUMENTS

2003/0198388 A1* 10/2003 Wenzel ............... G06K 9/6203
382/209
2007/0092142 A1* 4/2007 Kuriathungal ........ G06F 19/321
382/209
(Continued)

FOREIGN PATENT DOCUMENTS

| CN | 102306393 A | 1/2012 |
| CN | 103873863 A | 6/2014 |
| CN | 104244007 A | 12/2014 |

OTHER PUBLICATIONS

Li, B, et al. "Optimized Reference Frame Selection for Video Coding by Cloud", MMSP IEEE, 2011, 5 pages.
(Continued)

*Primary Examiner* — John B Strege
(74) *Attorney, Agent, or Firm* — Conley Rose, P.C.

(57) ABSTRACT

An image processing method and apparatus to reduce storage resource consumption includes determining, by a server, a first geometric shape according to a first image unit in a first image from an encoding-side device, where a similarity between the first image unit and the first geometric shape falls within a preset range; and sending encoding information of the first image to a decoding-side device, where the encoding information of the first image includes indication information of the first geometric shape and indication information of a location of the first image unit in the first image.

14 Claims, 6 Drawing Sheets

(51) Int. Cl.
*H04N 19/176* (2014.01)
*G06F 9/50* (2006.01)

(56) References Cited

U.S. PATENT DOCUMENTS

| | | | |
|---|---|---|---|
| 2008/0144942 A1* | 6/2008 | Besley | G06K 9/00456 |
| | | | 382/209 |
| 2012/0063678 A1* | 3/2012 | Asikainen | G06T 9/00 |
| | | | 382/165 |
| 2013/0294707 A1 | 11/2013 | Yomdin et al. | |
| 2014/0164419 A1 | 6/2014 | Kalevo et al. | |

OTHER PUBLICATIONS

Chen, J., et al. "Introduction to H.264 Advanced Video Coding" IEEE, 2006, pp. 736-741.
Machine Translation and Abstract of Chinese Publication No. CN104244007, Dec. 24, 2014, 101 pages.
Machine Translation and Abstract of Chinese Publication No. CN102306393, Jan. 4, 2012, 20 pages.
Foreign Communication From A Counterpart Application, PCT Application No. PCT/CN2015/085142, English Translation of International Search Report dated Sep. 28, 2015, 2 pages.

\* cited by examiner

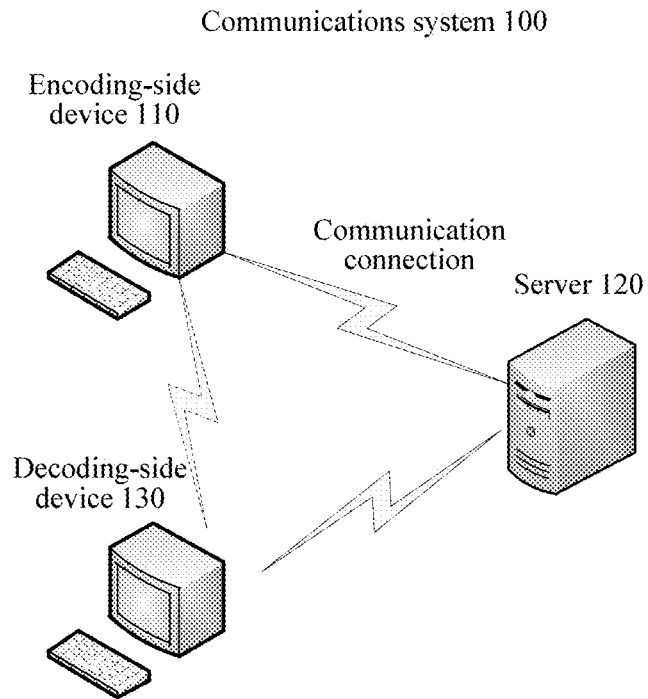

A server determines at least one first geometric shape in a preset geometric shape set according to a first image, the geometric shape set, and a preset similarity threshold, and determines at least one first image unit in the first image, where one first image unit corresponds to one first geometric shape, and a similarity between a first image unit and a corresponding first geometric shape is greater than or equal to the similarity threshold — S210

Generate first indication information used to indicate the first geometric shape — S220

Send the first indication information to a decoding-side device — S230

A decoding-side device receives first indication information that is used to indicate at least one first geometric shape and that is sent by a server, where the first geometric shape is determined by the server in a preset geometric shape set according to a first image, the geometric shape set, and a preset similarity threshold, the first image includes at least one first image unit, one first image unit corresponds to one first geometric shape, and a similarity between a first image unit and a corresponding first geometric shape is greater than or equal to the similarity threshold  S310

Determine the first geometric shape according to the first indication information  S320

Reconstruct the first image according to the first geometric shape  S330

An encoding-side device receives first indication information that is used to indicate at least one first geometric shape and that is sent by a server, where the first geometric shape is determined by the server in a preset geometric shape set according to a first image, the geometric shape set, and a preset similarity threshold, the first image includes at least one first image unit, one first image unit corresponds to one first geometric shape, and a similarity between a first image unit and a corresponding first geometric shape is greater than or equal to the similarity threshold  S410

Determine the first geometric shape according to the first indication information  S420

Determine at least one target first geometric shape in the first geometric shape according to the first geometric shape, a second image, and the similarity threshold, and determine at least one second image unit in the second image, where one second image unit corresponds to one target first geometric shape, and a similarity between a second image unit and a corresponding target first geometric shape is greater than or equal to the similarity threshold  S430

Generate second indication information used to indicate the target first geometric shape  S440

Send the second indication information to a decoding-side device  S450

FIG. 4

IMAGE PROCESSING METHOD AND APPARATUS

CROSS-REFERENCE TO RELATED APPLICATIONS

This application is a continuation application of International Patent Application No. PCT/CN2015/085142, filed on Jul. 27, 2015, the disclosure of which is hereby incorporated by reference in its entirety.

TECHNICAL FIELD

The disclosure relates to the communications field, and more specifically, to an image processing method and apparatus.

BACKGROUND

Currently, in a known image processing technology, provided that a requirement that image information is correct is met, an encoding-side device compresses an information amount of an image, so that the image adapts to bandwidth and a rate of a channel and is transmitted to a decoding-side device. In analog processing, an image is scanned at a particular rate or a quantity of spatial sampling points is further reduced, a grayscale of a sampling point is reduced (for example, a black and white binary image), and a signal band is compressed by using methods such as compressing bandwidth of a luminance signal and a chrominance signal and frequency interlacing. In digital processing, an image signal on which analog processing is performed is digitized.

As communications technologies are widely applied, users have increasing demands for image-type services, and also have an increasingly high requirement on image quality. Accordingly, processing complexity of the foregoing image processing technology and a requirement on processing performance of the encoding-side device also increase.

It is expected that an image processing technology is provided, to reduce processing complexity of an encoding-side device and reduce a requirement on processing performance of the encoding-side device.

SUMMARY

Embodiments of the disclosure provide an image processing method and apparatus, to reduce processing complexity of an encoding-side device and reduce a requirement on processing performance of the encoding-side device.

According to a first aspect, an image processing method is provided. The method includes determining, by a server, at least one first geometric shape in a preset geometric shape set according to a first image, the geometric shape set, and a preset similarity threshold, and determining at least one first image unit in the first image, where one first image unit corresponds to one first geometric shape, and a similarity between a first image unit and a corresponding first geometric shape is greater than or equal to the similarity threshold; generating first indication information used to indicate the first geometric shape; and sending the first indication information to a decoding-side device.

With reference to the first aspect, in a first implementation of the first aspect, the method further includes sending the first indication information to an encoding-side device, so that the encoding-side device determines at least one target first geometric shape in the first geometric shape according to the first geometric shape, a second image, and the similarity threshold, determines at least one second image unit in the second image, generates second indication information used to indicate the target first geometric shape, and sends the second indication information to the decoding-side device, where one second image unit corresponds to one target first geometric shape, and a similarity between a second image unit and a corresponding target first geometric shape is greater than or equal to the similarity threshold.

With reference to the first aspect and the foregoing implementation of the first aspect, in a second implementation of the first aspect, the method further includes determining, by the server, at least one third image unit in the first image according to the first image, the geometric shape set, and the similarity threshold, where a similarity between a third image unit and each geometric shape in the geometric shape set is less than the similarity threshold; generating at least one second geometric shape according to the third image unit, where one third image unit corresponds to one second geometric shape, and a similarity between a third image unit and a corresponding second geometric shape is greater than or equal to the similarity threshold; generating third indication information used to indicate the second geometric shape; and sending the third indication information to the decoding-side device.

With reference to the first aspect and the foregoing implementations of the first aspect, in a third implementation of the first aspect, the method further includes sending the third indication information to the encoding-side device, so that the encoding-side device determines at least one target second geometric shape in the second geometric shape according to the second geometric shape, a fourth image, and the similarity threshold, determines at least one fourth image unit in the fourth image, generates fourth indication information used to indicate the target second geometric shape, and sends the fourth indication information to the decoding-side device, where one fourth image unit corresponds to one target second geometric shape, and a similarity between a fourth image unit and a corresponding target second geometric shape is greater than or equal to the similarity threshold.

According to a second aspect, an image processing method is provided. The method includes receiving, by a decoding-side device, first indication information that is used to indicate at least one first geometric shape and that is sent by a server, where the first geometric shape is determined by the server in a preset geometric shape set according to a first image, the geometric shape set, and a preset similarity threshold, the first image includes at least one first image unit, one first image unit corresponds to one first geometric shape, and a similarity between a first image unit and a corresponding first geometric shape is greater than or equal to the similarity threshold; determining the first geometric shape according to the first indication information; and reconstructing the first image according to the first geometric shape.

With reference to the second aspect, in a first implementation of the second aspect, the method further includes receiving third indication information that is used to indicate at least one second geometric shape and that is sent by the server, where the second geometric shape is generated by the server according to at least one third image unit, one third image unit corresponds to one second geometric shape, a similarity between a third image unit and a corresponding second geometric shape is greater than or equal to the similarity threshold, the third image unit is determined by the server according to the first image, the geometric shape set, and the similarity threshold, and a similarity between a third image unit and each geometric shape in the geometric shape set is less than the similarity threshold; and determining the second geometric shape according to the third indication information; and the reconstructing the first image according to the first geometric shape includes reconstructing the first image according to the first geometric shape and the second geometric shape.

According to a third aspect, an image processing method is provided. The method includes receiving, by an encoding-side device, first indication information that is used to indicate at least one first geometric shape and that is sent by a server, where the first geometric shape is determined by the server in a preset geometric shape set according to a first image, the geometric shape set, and a preset similarity threshold, the first image includes at least one first image unit, one first image unit corresponds to one first geometric shape, and a similarity between a first image unit and a corresponding first geometric shape is greater than or equal to the similarity threshold; determining the first geometric shape according to the first indication information; determining at least one target first geometric shape in the first geometric shape according to the first geometric shape, a second image, and the similarity threshold, and determining at least one second image unit in the second image, where one second image unit corresponds to one target first geometric shape, and a similarity between a second image unit and a corresponding target first geometric shape is greater than or equal to the similarity threshold; generating second indication information used to indicate the target first geometric shape; and sending the second indication information to the decoding-side device.

With reference to the third aspect, in a first implementation of the third aspect, the method further includes receiving third indication information that is used to indicate at least one second geometric shape and that is sent by the server, where the second geometric shape is generated by the server according to at least one third image unit, one third image unit corresponds to one second geometric shape, a similarity between a third image unit and a corresponding second geometric shape is greater than or equal to the similarity threshold, the third image unit is determined by the server according to the first image, the geometric shape set, and the similarity threshold, and a similarity between a third image unit and each geometric shape in the geometric shape set is less than the similarity threshold; determining the second geometric shape according to the third indication information; and determining at least one target second geometric shape in the second geometric shape according to the second geometric shape, a fourth image, and the similarity threshold, and determining at least one fourth image unit in the fourth image, generating fourth indication information used to indicate the target second geometric shape, and sending the fourth indication information to the decoding-side device, where one fourth image unit corresponds to one target second geometric shape, and a similarity between a fourth image unit and a corresponding target second geometric shape is greater than or equal to the similarity threshold; generating fourth indication information used to indicate the target second geometric shape; and sending the fourth indication information to the decoding-side device.

According to a fourth aspect, an image processing apparatus is provided. The apparatus includes a determining unit configured to determine at least one first geometric shape in a preset geometric shape set according to a first image, the geometric shape set, and a preset similarity threshold, and determine at least one first image unit in the first image, where one first image unit corresponds to one first geometric shape, and a similarity between a first image unit and a corresponding first geometric shape is greater than or equal to the similarity threshold; a generation unit configured to generate first indication information used to indicate the first geometric shape; and a sending unit configured to send the first indication information to a decoding-side device.

With reference to the fourth aspect, in a first implementation of the fourth aspect, the sending unit is further configured to send the first indication information to an encoding-side device, so that the encoding-side device determines at least one target first geometric shape in the first geometric shape according to the first geometric shape, a second image, and the similarity threshold, determines at least one second image unit in the second image, generates second indication information used to indicate the target first geometric shape, and sends the second indication information to the decoding-side device, where one second image unit corresponds to one target first geometric shape, and a similarity between a second image unit and a corresponding target first geometric shape is greater than or equal to the similarity threshold.

With reference to the fourth aspect and the foregoing implementation of the fourth aspect, in a second implementation of the fourth aspect, the determining unit is further configured to determine at least one third image unit in the first image according to the first image, the geometric shape set, and the similarity threshold, where a similarity between a third image unit and each geometric shape in the geometric shape set is less than the similarity threshold; the generation unit is further configured to generate at least one second geometric shape according to the third image unit, and generate third indication information used to indicate the second geometric shape, where one third image unit corresponds to one second geometric shape, and a similarity between a third image unit and a corresponding second geometric shape is greater than or equal to the similarity threshold; and the sending unit is further configured to send the third indication information to the decoding-side device.

With reference to the fourth aspect and the foregoing implementations of the fourth aspect, in a third implementation of the fourth aspect, the sending unit is further configured to send the third indication information to the encoding-side device, so that the encoding-side device determines at least one target second geometric shape in the second geometric shape according to the second geometric shape, a fourth image, and the similarity threshold, determines at least one fourth image unit in the fourth image, generates fourth indication information used to indicate the target second geometric shape, and sends the fourth indication information to the decoding-side device, where one fourth image unit corresponds to one target second geometric shape, and a similarity between a fourth image unit and a corresponding target second geometric shape is greater than or equal to the similarity threshold.

According to a fifth aspect, an image processing apparatus is provided. The apparatus includes a receiving unit configured to receive first indication information that is used to indicate at least one first geometric shape and that is sent by a server, where the first geometric shape is determined by the server in a preset geometric shape set according to a first image, the geometric shape set, and a preset similarity threshold, the first image includes at least one first image unit, one first image unit corresponds to one first geometric shape, and a similarity between a first image unit and a corresponding first geometric shape is greater than or equal to the similarity threshold; a determining unit configured to determine the first geometric shape according to the first indication information; and a processing unit configured to reconstruct the first image according to the first geometric shape.

With reference to the fifth aspect, in a first implementation of the fifth aspect, the receiving unit is further configured to receive third indication information that is used to indicate at least one second geometric shape and that is sent by the server, where the second geometric shape is generated by the server according to at least one third image unit, one third image unit corresponds to one second geometric shape, a similarity between a third image unit and a corresponding second geometric shape is greater than or equal to the similarity threshold, the third image unit is determined by the server according to the first image, the geometric shape set, and the similarity threshold, and a similarity between a third image unit and each geometric shape in the geometric shape set is less than the similarity threshold; the determining unit is further configured to determine the second geometric shape according to the third indication information; and the processing unit reconstructs the first image according to the first geometric shape and the second geometric shape.

According to a sixth aspect, an image processing apparatus is provided. The apparatus includes a receiving unit configured to receive first indication information that is used to indicate at least one first geometric shape and that is sent by a server, where the first geometric shape is determined by the server in a preset geometric shape set according to a first image, the geometric shape set, and a preset similarity threshold, the first image includes at least one first image unit, one first image unit corresponds to one first geometric shape, and a similarity between a first image unit and a corresponding first geometric shape is greater than or equal to the similarity threshold; a determining unit configured to determine the first geometric shape according to the first indication information; a processing unit configured to determine at least one target first geometric shape in the first geometric shape according to the first geometric shape, a second image, and the similarity threshold, and determine at least one second image unit in the second image, where one second image unit corresponds to one target first geometric shape, and a similarity between a second image unit and a corresponding target first geometric shape is greater than or equal to the similarity threshold; a generation unit configured to generate second indication information used to indicate the target first geometric shape; and a sending unit configured to send the second indication information to a decoding-side device.

With reference to the sixth aspect, in a first implementation of the sixth aspect, the receiving unit is further configured to receive third indication information that is used to indicate at least one second geometric shape and that is sent by the server, where the second geometric shape is generated by the server according to at least one third image unit, one third image unit corresponds to one second geometric shape, a similarity between a third image unit and a corresponding second geometric shape is greater than or equal to the similarity threshold, the third image unit is determined by the server according to the first image, the geometric shape set, and the similarity threshold, and a similarity between a third image unit and each geometric shape in the geometric shape set is less than the similarity threshold; the determining unit is further configured to determine the second geometric shape according to the third indication information; the processing unit is further configured to determine at least one target second geometric shape in the second geometric shape according to the second geometric shape, a fourth image, and the similarity threshold, and determine at least one fourth image unit in the fourth image, generate fourth indication information used to indicate the target second geometric shape, and send the fourth indication information to the decoding-side device, where one fourth image unit corresponds to one target second geometric shape, and a similarity between a fourth image unit and a corresponding target second geometric shape is greater than or equal to the similarity threshold; the generation unit is further configured to generate fourth indication information used to indicate the target second geometric shape; and the sending unit is further configured to send the fourth indication information to the decoding-side device.

In the image processing method and apparatus according to the embodiments of the disclosure, the server divides the first image obtained from the encoding-side device into multiple image units, and sends indication information of the first geometric shape whose similarity with the first image unit is greater than or equal to the preset similarity threshold to the decoding-side device. In this way, the decoding-side device can reconstruct the first image according to the first geometric shape, the encoding-side device does not need to perform complex processing such as image compression, and processing complexity of the encoding-side device and a requirement on processing performance of the encoding-side device can be reduced.

BRIEF DESCRIPTION OF DRAWINGS

FIG. 1 is a schematic architecture of a communications system that uses an image processing method according to the disclosure;

FIG. 2 is a schematic flowchart of an image processing method according to an embodiment of the disclosure;

FIG. 3 is a schematic flowchart of an image processing method according to another embodiment of the disclosure;

FIG. 4 is a schematic flowchart of an image processing method according to still another embodiment of the disclosure;

DESCRIPTION OF EMBODIMENTS

Figure 5:
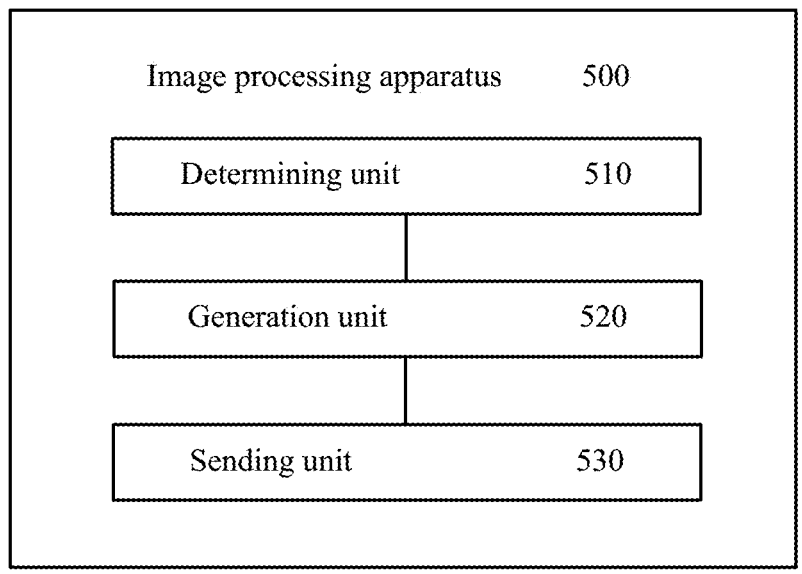
FIG. 5 is a schematic block diagram of an image processing apparatus according to an embodiment of the disclosure.

The following clearly describes the technical solutions in the embodiments of the disclosure with reference to the accompanying drawings in the embodiments of the disclosure. The described embodiments are some but not all of the embodiments of the disclosure. All other embodiments obtained by a person of ordinary skill in the art based on the embodiments of the disclosure without creative efforts shall fall within the protection scope of the disclosure.

Terminologies such as "unit" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from one component interacting with another component in a local system, a distributed system, and/or across a network such as the Internet interacting with other systems by using the signal).

FIG. 1 is a schematic architecture of a communications system 100 that uses an image processing method according to the disclosure. As shown in FIG. 1, the system includes an encoding-side device 110, a server 120, and a decoding-side device 130. Each of the encoding-side device 110 and the decoding-side device 130 is in communication connection with the server 120. That is, the encoding-side device 110 may transmit data or information to the server 120 and the server 120 may transmit data or information to the decoding-side device 130.

It should be understood that, the above listed devices included in the communications system 100 are only an example for description, the disclosure is not limited thereto, and another device such as a higher layer management device may alternatively be configured according to a requirement.

Optionally, the encoding-side device 110 and the decoding-side device 130 may be in communication connection (that is, communication connection shown by a dashed line in FIG. 1), to transmit data or information.

Herein, a manner of communication between devices in the communications system 100 may be any communication manner in the prior art, and this is not particularly limited in the disclosure. For example, an existing cellular communications system such as a Global System for Mobile Communications (GSM) system, a Wideband Code Division Multiple Access (WCDMA) system, or a Long Term Evolution (LTE) system may be used. Alternatively, an optical fiber communications system, an Ethernet communications system, or the like may be used.

It should be noted that, quantities of encoding-side devices 110, servers 120, and decoding-side devices 130 included in the communications system 100 may be randomly set. This is not particularly limited in the disclosure. For example, the server 120 may be a server cluster including multiple servers.

In addition, in this embodiment of the disclosure, the server 120, the encoding-side device 110, and the decoding-side device have an independent operation processing module unit, and can independently complete an image processing process described below. In addition, the server 120 may be configured independent of the encoding-side device 110 or the decoding-side device 130, for example, geographical addresses are different. Alternatively, the server 120 may be configured in combination with the encoding-side device 110 or the decoding-side device 130, for example, geographical addresses are the same. This can help implement high speed transmission between the server 120 and the encoding-side device 110 or the decoding-side device 130 by using a high speed transmission cable or the like.

In this embodiment of the disclosure, the encoding-side device and the decoding-side device may be terminal devices. The terminal device may alternatively be referred to as user equipment (UE), an access terminal, a subscriber unit, a subscriber station, a mobile station, a mobile station, a remote station, a remote terminal, a mobile device, a user terminal, a terminal, a wireless communications device, a user agent, or a user apparatus. The terminal device may be a station (ST) in a wireless local area networks (WLAN), or may be a cellular phone, a cordless telephone set, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a future $5^{th}$ generation (5G) network, a terminal device in a future evolved public land mobile network (PLMN) network, or the like.

In addition, various aspects or features of the disclosure may be implemented as a method, an apparatus, or an artifact using a standard programming and/or engineering technology. The term "artifact" used in this application includes a computer program that may be accessed from any computer readable device, carrier, or medium. For example, the computer readable medium may include, but is not limited to a magnetic storage device (for example, a hard disk, a floppy disk, or a magnetic tape), an optical disk (for example, a compact disk (CD), or a digital versatile disk (DVD)), a smart card, or a flash storage device (for example, an erasable programmable read-only memory (EPROM), or a card, stick, or key drive). In addition, various storage mediums described in this specification may represent one or more devices and/or another machine readable medium used to store information. The term "machine readable medium" may include, but is not limited to, a radio channel and various other mediums that can store, include, and/or carry an instruction and/or data.

FIG. 2 is a schematic flowchart of an image processing method 200 according to an embodiment of the disclosure from the perspective of a server. As shown in FIG. 2, the method 200 includes the following steps.

S210: A server determines at least one first geometric shape in a preset geometric shape set according to a first image, the geometric shape set, and a preset similarity threshold, and determines at least one first image unit in the first image, where one first image unit corresponds to one first geometric shape, and a similarity between a first image unit and a corresponding first geometric shape is greater than or equal to the similarity threshold.

S220: Generate first indication information used to indicate the first geometric shape.

S230: Send the first indication information to a decoding-side device.

In this embodiment of the disclosure, the server may pre-store a geometric shape set including multiple geometric shapes. The geometric shape may also be referred to as a feature word, and the geometric shape set may also be referred to as a feature dictionary (including multiple feature words).

In addition, in this embodiment of the disclosure, the geometric shape may include lines, for example, may be a triangle, a circle, a rectangle, a trapezoid, or another polygon. Alternatively, the geometric shape may be an irregular shape, for example, an outline of a real object including lines.

In addition, the geometric shape may alternatively be a feature shape such as a Haar-like feature extracted by using, for example, a computer vision technology.

In addition, in this embodiment of the disclosure, the geometric shape may be a separate shape listed above or a combination of multiple shapes. This is not particularly limited in the disclosure. For example, the geometric shape may be an outline of a bicycle including a triangle and a circle.

When an encoding-side device needs to send an image A to the decoding-side device, the encoding-side device may transmit related data of content of the image A (for example, the image A itself) to the server. By way of example, and not limitation, the related data of the content of the image A may be data generated after the encoding-side device performs encoding processing on the image A by means of lossless compression encoding, lossy compression encoding (for example, encoding that reduces a resolution, or encoding that reduces a frame rate), or any other known encoding manner.

It should be noted that, in this embodiment of the disclosure, the image A may be an independent image such as a photograph, or may be a frame of image in a video. This is not particularly limited in the disclosure.

In addition, in the current image processing field, an image may be further divided into strips (also referred to as slices), and a slice is further divided into blocks. During image encoding, starting from the upper left corner of the image, encoding processing is performed row by row from left to right and from top to bottom on a per-block basis. Correspondingly, in this embodiment of the disclosure, the image A may be an image strip or an image block in a complete image. This is not particularly limited in the disclosure.

In this way, in S220, the server may obtain the image A, and determine a part that is in the image A and that can be represented by the geometric shape.

For example, the server may perform search and detection on various parts of the image A according to a size of a preset sliding window, that is, detect similarities between an image block in the sliding window and the preset multiple geometric shapes (in the geometric shape set). It should be noted that, in this embodiment of the disclosure, a shape of an image block in the sliding window depends on a shape of the sliding window, and the shape of the sliding window may be randomly set according to a requirement. This is not particularly limited in the disclosure. For example, when the processed image is a photograph of a bicycle, the image block may be a circle, a triangle, or the like.

By way of example, and not limitation, in this embodiment of the disclosure, the "similarity" may be a structural similarity (SSIM). A SSIM index defines, from the perspective of image composition, structural information as an attribute that is independent of a luminance and a contrast and that reflects a structure of an object in a scenario, and distortion is modeled by using a combination of three different factors, such as a luminance, a contrast, and a structure. This is an implementation of a SSIM theory. An average value is used as an estimation of a luminance, a standard deviation is used as an estimation of a contrast, and a covariance is used as a measurement of a SSIM.

Without loss of generality, processing of an image block #1 is used as an example for description.

First, the server may preprocess the image block #1, for example, perform scaling processing, to obtain an image block #2 that can be compared with a geometric shape #α. For example, areas of the geometric shape #α and the image block #2 are the same, or a difference between areas of the geometric shape #α and the image block #2 falls within a preset range (for example, accounts for, for example, 10% of the area of the geometric shape #α or the image block #2).

Next, the server may calculate an image structural similarity between the geometric shape #α and the image block #2. For example, the server may use the geometric shape #α and the image block #2 as two images, and obtain an SSIM between the geometric shape #α and the image block #2 by using a calculation formula for calculating an SSIM between images in the prior art. A value range of the SSIM is [0, 1].

When the similarity is greater than or equal to the preset similarity threshold (for example, 0.9), that is, the similarity between the geometric shape #α and the image block #2 is greater than or equal to 0.9, the server may determine that a similarity between the image block #1 and the geometric shape #α is greater than or equal to the preset similarity threshold. That is, the image block #1 may be used as an image unit #1 (that is, an example of the first image unit) that can be represented by the geometric shape #α (an example of the first geometric shape).

It should be noted that, for example, when there are multiple geometric shapes whose similarities with the image unit #1 are greater than the preset similarity threshold, a geometric shape may be randomly selected as a geometric shape corresponding to the image unit #1, or a geometric shape whose similarity with the image unit #1 is largest may be selected as a geometric shape corresponding to the image unit #1. This is not particularly limited in the disclosure.

In a similar step, the server performs search and detection on the image A for multiple times by changing a size or a shape of the sliding window, to determine each first image unit (that is, an image unit whose similarity with a geometric shape in the geometric shape set is greater than or equal to the preset similarity threshold) in the image A and a geometric shape corresponding to each first image unit.

It should be understood that, the similarity determining method listed above is only an example for description, the disclosure is not limited thereto, and similarities obtained by using another similarity theory in the prior art all fall within the protection scope of the disclosure.

It should be noted that, in this embodiment of the disclosure, the image unit may present an entire real object or a part of a real object, and may be determined by adjusting, for example, a shape of the sliding window. For example, if the image A presents a bicycle, the image unit #1 may be the entire bicycle, and correspondingly the geometric shape #α may be an outline of the bicycle including lines (for example, formed by combining multiple triangles and circles). Alternatively, the image unit #1 may be a part of the bicycle, for example, a wheel, and correspondingly the geometric shape #α may be an outline of the wheel including lines (for example, including a circle).

Descriptions of same or similar cases are omitted below to avoid repetition.

In the foregoing manner, the server can determine a part that is in the image A and that can be represented by a feature word (for ease of understanding and distinguishing, the part is referred to as an "expressible part" below).

In S220, the server may generate indication information (that is, an example of the first indication information) used to indicate the first geometric shape that includes the geometric shape #α and that corresponds to each first image unit in the image A.

The first indication information is sent to the decoding-side device. In this way, the decoding-side device can reconstruct the first image unit (for example, the image unit #1) in the image A based on the first geometric shape (for example, the geometric shape #α) according to the first indication information (for example, indication information of the geometric shape #α).

Optionally, the method further includes determining a location of each first image unit in the first image; generating fifth indication information used to indicate the location of each first image unit in the first image; and sending the fifth indication information to the decoding-side device.

Without loss of generality, the server may determine a location of the image unit #1 corresponding to the geometric shape #α in the image A, and send indication information (that is, an example of the fifth indication information) of the location of the image unit #1 in the image A to the decoding-side device. In this way, the decoding-side device may determine, according to the indication information of the geometric shape #α, that the image A includes the image unit #1 corresponding to the geometric shape #α, and determine the location of the image unit #1 in the image A according to the indication information of the location of the image unit #1 in the image A. Therefore, the image unit #1 of the image A can be reconstructed.

Similarly, the server may send indication information of a feature word (in other words, a geometric shape) corresponding to each expressible part in the image A, and indication information of a location of each expressible part of the image A in the image A to the decoding-side device.

For example, when each image unit in the image A can be expressed by the feature word, the decoding-side device may determine each image unit in the image A according to the indication information of the feature word corresponding to each expressible part in the image A. In addition, the decoding-side device may determine a location of each image unit in the image A according to indication information of a location of each expressible part of the image A in the image A. In this way, the image A can be reconstructed. Therefore, transmission of the image A from the encoding-side device to the decoding-side device is implemented.

Optionally, the method further includes determining a difference between the first image unit and the corresponding first geometric shape; generating sixth indication information used to indicate the difference between the first image unit and the corresponding first geometric shape; and sending the sixth indication information to the decoding-side device.

In an embodiment, the server may further determine a difference between each image unit and a corresponding feature word, and send indication information of the difference to the decoding-side device. In this way, the decoding-side device may perform compensation according to the indication information of the difference when determining each image unit in the image A, to improve precision and accuracy of each determined image unit in the image A.

Without loss of generality, encoding information of the first image may include indication information of a difference between the geometric shape #α and the image unit #1 (that is, an example of the indication information of the difference between the first image unit and the first geometric shape). In this way, the decoding-side device determines the difference between the geometric shape #α and the image unit #1, and determines (in other words, reconstructs) the image unit #1 based on the difference and the geometric shape #α.

It should be noted that, the above listed manner of determining each image unit based on a difference between the image unit and a corresponding feature word is only an example for description. The disclosure is not limited thereto. For example, if the "similarity threshold" is sufficiently small, it indicates that each feature word and a corresponding image unit are sufficiently similar, and the decoding-side device can directly determine each image unit according to each feature word.

In addition, because a scale of the feature dictionary is limited, it is possible that some image units in the image A cannot be expressed by feature words (for ease of understanding and distinguishing, the image units are referred to as "inexpressible parts" below).

In this case, the server may perform encoding processing on the inexpressible part based on the prior art, and send data obtained after encoding processing to the decoding-side device. Correspondingly, the decoding-side device may perform decoding processing on the data based on the prior art to restore the inexpressible part, and reconstruct the image A based on the inexpressible part and the expressible part.

Alternatively, optionally, the method further includes determining, by the server, at least one third image unit in the first image according to the first image, the geometric shape set, and the similarity threshold, where a similarity between a third image unit and each geometric shape in the geometric shape set is less than the similarity threshold; generating at least one second geometric shape according to the third image unit, where one third image unit corresponds to one second geometric shape, and a similarity between a third image unit and a corresponding second geometric shape is greater than or equal to the similarity threshold; generating third indication information used to indicate the second geometric shape; and sending the third indication information to the decoding-side device.

Without loss of generality, processing of an image block #3 in the image A is used as an example for description.

First, the server may preprocess the image block #3, for example, perform scaling processing, to obtain an image block #4 that can be compared with a geometric shape #β. For example, areas of the geometric shape #β and the image block #4 are the same, or a difference between areas of the geometric shape #β and the image block #4 falls within a preset range (for example, accounts for, for example, 10% of the area of the geometric shape #β or the image block #4).

Next, the server may calculate an image structural similarity between the geometric shape #β and the image block #4. For example, the server may use the geometric shape #β and the image block #4 as two images, and obtain an SSIM between the geometric shape #β and the image block #4 by using a calculation formula for calculating an SSIM between images in the prior art. A value range of the SSIM is [0, 1].

When the similarity is less than the preset similarity threshold (for example, 0.9), that is, a similarity between the geometric shape #β and the image block #4 is less than 0.9, the server may determine that a similarity between the image block #3 and the geometric shape #β is less than the preset similarity threshold. That is, the image block #3 cannot be expressed by the geometric shape #β.

Similarly, when the server determines that a similarity (for example, an SSIM) between each geometric image in the preset geometric shape set and the image block #3 is less than the preset similarity threshold, the server may use the image block #3 as an image unit #3 (that is, an example of the third image unit) that cannot be expressed by the preset feature dictionary.

In a similar step, the server performs search and detection on the image A for multiple times by changing a size or a shape of the sliding window, to determine each third image unit (that is, an image unit whose similarity with any geometric shape in the geometric shape set is less than the preset similarity threshold) in the image A.

Next, the server may extract, by using, for example, a computer vision technology, a feature shape such as a Haar-like feature of each third image unit as a geometric shape (that is, the second geometric shape) corresponding to the third image unit.

In a similar step, the server performs search and detection on the image A for multiple times by changing a size or a shape of the sliding window, to determine each third image unit in the image A and the second geometric shape corresponding to the third image unit.

Next, the server may generate indication information (that is, an example of the third indication information) used to indicate the second geometric shape that includes the geometric shape #β and that corresponds to each third image unit in the image A.

The third indication information is sent to the decoding-side device. In this way, the decoding-side device can reconstruct the third image unit (for example, the image unit #3) in the image A based on the second geometric shape (for example, the geometric shape #β) according to the third indication information (for example, indication information of the geometric shape #β).

Optionally, the method further includes determining a location of each third image unit in the first image; generating seventh indication information used to indicate the location of each third image unit in the first image; and sending the seventh indication information to the decoding-side device.

Without loss of generality, the server may determine a location of the image unit #3 corresponding to the geometric shape #β in the image A, and send indication information (that is, an example of the seventh indication information) of the location of the image unit #3 in the image A to the decoding-side device. In this way, the decoding-side device may determine, according to the indication information of the geometric shape #β, that the image A includes the image unit #3 corresponding to the geometric shape #β, and determine the location of the image unit #3 in the image A according to the indication information of the location of the image unit #3 in the image A. Therefore, the image unit #3 of the image A can be reconstructed.

Similarly, the server may send indication information of a feature word (in other words, a geometric shape) corresponding to each inexpressible part in the image A, and indication information of a location of each inexpressible part of the image A in the image A to the decoding-side device.

Optionally, the method further includes determining a difference between the third image unit and the corresponding second geometric shape; generating eighth indication information used to indicate the difference between the third image unit and the corresponding second geometric shape; and sending the eighth indication information to the decoding-side device.

In an embodiment, the server may further determine a difference between each image unit and a corresponding geometric shape, and send indication information of the difference to the decoding-side device. In this way, the decoding-side device may perform compensation according to the indication information of the difference when determining each image unit in the image A, to improve precision and accuracy of each determined image unit in the image A.

It should be noted that, in this embodiment of the disclosure, the server may directly send the encoding information (for example, the encoding information may include the first indication information, the third indication information, the fifth indication information, the sixth indication information, the seventh indication information, and the eighth indication information) of the first image to the decoding-side device. Alternatively, the server may send the encoding information of the first image to the encoding-side device, and the encoding-side device may forward the encoding information of the first image to the decoding-side device. This is not particularly limited in the disclosure.

Optionally, the method further includes sending the first indication information to an encoding-side device, so that the encoding-side device determines at least one target first geometric shape in the first geometric shape according to the first geometric shape, a second image, and the similarity threshold, determines at least one second image unit in the second image, generates second indication information used to indicate the target first geometric shape, and sends the second indication information to the decoding-side device, where one second image unit corresponds to one target first geometric shape, and a similarity between a second image unit and a corresponding target first geometric shape is greater than or equal to the similarity threshold.

In this embodiment of the disclosure, the server may further send indication information (for example, indication information of the first geometric shape) of a geometric shape (in other words, a feature word) corresponding to each expressible part in the image A and/or indication information (for example, indication information of the second geometric shape) of a geometric shape (in other words, a feature word) corresponding to each inexpressible part in the image A to the encoding-side device. In addition, the encoding-side device may store each received geometric shape as a feature word.

In this way, when the encoding-side device needs to send an image B (that is, an example of the second image or the fourth image) to the decoding-side device, the encoding-side device may determine a part that is in the image B and that can be expressed by the received geometric shape (for example, the geometric shape #α or the geometric shape #β). In an embodiment, the server may determine a similarity between each presented object in the image B (that is, each image unit of each image B) and the geometric shape (in other words, a feature word) indicated by the indication information of the first geometric shape.

An image unit that is in the image B and whose similarity with the geometric shape is greater than or equal to the preset threshold is used as an image unit (that is, the third image unit or the fourth image unit) that can be expressed by a feature word.

A method and a process of determining, by the encoding-side device, each expressible part in the image B and a geometric shape corresponding to each expressible part are similar to a method and a process of determining, by the server, each first image unit in the image A and a geometric shape corresponding to each first image unit. Herein, a detailed description thereof is omitted to avoid repetition.

In the foregoing manner, the encoding-side device can determine a part (that is, an expressible part) that is in the image B and that can be expressed by a feature word.

In addition, the encoding-side device may determine a location of each expressible part of the image B in the image B. This process may be similar to that in the prior art, and a detailed description thereof is omitted to avoid repetition.

The encoding-side device may send indication information (that is, an example of the second indication information or the fourth indication information) that includes a feature word (in other words, a geometric shape) corresponding to each expressible part (that is, the third image unit or the fourth image unit) in the image B, and indication information of a location of each expressible part of the image B in the image B to the decoding-side device.

For example, when each image unit in the image B can be expressed by the feature word, the decoding-side device may determine each image unit in the image B according to the indication information of the feature word corresponding to each expressible part in the image B. In addition, the decoding-side device may determine a location of each image unit in the image B according to indication information of a location of each expressible part of the image B in the image B. In this way, the image B can be reconstructed. Therefore, transmission of the image B from the encoding-side device to the decoding-side device is implemented.

In addition, the encoding-side device may further determine a difference between each expressible part in the image B and a corresponding feature word, and send indication information of the difference to the decoding-side device. In this way, the decoding-side device may perform compensation according to the indication information of the difference when determining each image unit in the image B, to improve precision and accuracy of each determined image unit in the image B.

In addition, because a scale of the feature dictionary is limited, it is possible that some image units in the image B cannot be expressed by feature words (for ease of understanding and distinguishing, the image units are referred to as "inexpressible parts" below).

In this case, the encoding-side device may perform encoding processing on the inexpressible part based on the prior art, and send data obtained after encoding processing to the decoding-side device. Correspondingly, the decoding-side device may perform decoding processing on the data based on the prior art to restore the inexpressible part, and reconstruct the image B based on the inexpressible part and the expressible part.

It should be noted that, in this embodiment of the disclosure, the encoding-side device may directly send the encoding information (for example, the encoding information may include the second indication information or the fourth indication information) of the image B to the decoding-side device. Alternatively, the encoding-side device may send the encoding information of the image B to the server, and the server may forward the encoding information of the image B to the decoding-side device. This is not particularly limited in the disclosure.

Optionally, the second image and the first image belong to a same video; or the fourth image and the first image belong to a same video. In an embodiment, when the image B and the image A belong to a same video, a similarity between the image B and the image A may be relatively high, for example, presented content is the same. In this case, it is also relatively highly possible that an image unit in the image B can be expressed by a geometric shape corresponding to an image unit in the image A. Therefore, processing efficiency of the method 100 can be further improved.

It should be noted that, in this embodiment of the disclosure, the second image and the fourth image may be a same image or different images. Correspondingly, the second indication information and the fourth indication information may be same information or different information, and the second image unit and the fourth image unit may be a same image unit or different image units. This is not particularly limited in the disclosure.

The following describes in detail a form of indication information of a geometric shape (in other words, indication information of a feature word, for example, the first indication information, the second indication information, the third indication information, or the fourth indication information) in this embodiment of the disclosure.

For example, optionally, in this embodiment of the disclosure, the indication information of the geometric shape may be data obtained after the server performs encoding processing on the geometric shape, and the decoding-side device may directly reconstruct the geometric shape according to the data.

For another example, optionally, the server and the decoding-side device store first mapping relationship information, and the first mapping relationship information is used to indicate one-to-one correspondences between multiple first geometric shapes and multiple first index values; and the generating first indication information used to indicate the target first geometric shape includes using a first index value corresponding to the target first geometric shape as the first indication information.

Optionally, the method further includes generating second mapping relationship information, where the second mapping relationship information is used to indicate a one-to-one correspondence between the at least one second geometric shape and at least one second index value; and sending the second mapping relationship information to the decoding-side device; and the generating second indication information used to indicate the second geometric shape includes using a second index value corresponding to the second geometric shape as the second indication information.

Optionally, the server, the decoding-side device, and the encoding-side device store mapping relationship information, the mapping relationship information is used to indicate one-to-one correspondences between multiple geometric shapes and multiple index values, and the first geometric shape belongs to the multiple geometric shapes; and the indication information of the first geometric shape is an index value corresponding to the first geometric shape.

As described above, the server, the decoding-side device, and the encoding-side device may pre-store same multiple geometric shapes, and each geometric shape is indexed by using a same correspondence. That is, in the server, the decoding-side device, and the encoding-side device, a same geometric shape can be uniquely determined for one index value.

In this way, an index value corresponding to the first geometric shape may be used as the indication information of the first geometric shape.

In addition, in this embodiment of the disclosure, a network administrator or an operator may pre-store the multiple geometric shapes in the server, and the server generates mapping relationship information (for example, a mapping entry) of each geometric shape and each index value, and transmits each geometric shape and the mapping relationship information to the decoding-side device and the encoding-side device.

In addition, when the server, the decoding-side device, and the encoding-side device store a relatively large quantity of geometric shapes, the decoding-side device or the encoding-side device may need to traverse the stored geometric shapes based on the index value corresponding to the first geometric shape. In an extreme case, all geometric shapes may need to be traversed to obtain the first geometric shape.

In addition, for example, when a transmitted image includes multiple expressible parts, an entire processing time, that is, a total time used to determine geometric shapes corresponding to all the expressible parts is further increased.

In this case, the server may reallocate index values to the multiple expressible parts, and send mapping relationship information of the reallocated index values and geometric shapes corresponding to the multiple expressible parts to the encoding-side device or the decoding-side device. In addition, the encoding-side device or the decoding-side device may store and index, independent of mass pre-stored geometric shapes, a geometric shape corresponding to an expressible part of the image. In this way, when the decoding-side device or the encoding-side device processes a same image, the decoding-side device or the encoding-side device can quickly find, based on storage and indexing of the independently stored geometric shape corresponding to the expressible part of the image, a geometric shape corresponding to each expressible part of the image.

In the image processing method according to this embodiment of the disclosure, the server divides the first image obtained from the encoding-side device into multiple image units, and sends indication information of the first geometric shape whose similarity with the first image unit is greater than or equal to the preset similarity threshold to the decoding-side device. In this way, the decoding-side device can reconstruct the first image according to the first geometric shape, the encoding-side device does not need to perform complex processing such as image compression, and processing complexity of the encoding-side device and a requirement on processing performance of the encoding-side device can be reduced.

FIG. 3 is a schematic flowchart of an image processing method 300 according to another embodiment of the disclosure from the perspective of a decoding-side device. As shown in FIG. 3, the method 300 includes the following steps.

S310: A decoding-side device receives first indication information that is used to indicate at least one first geometric shape and that is sent by a server, where the first geometric shape is determined by the server in a preset geometric shape set according to a first image, the geometric shape set, and a preset similarity threshold, the first image includes at least one first image unit, one first image unit corresponds to one first geometric shape, and a similarity between a first image unit and a corresponding first geometric shape is greater than or equal to the similarity threshold.

S320: Determine the first geometric shape according to the first indication information.

S330: Reconstruct the first image according to the first geometric shape.

Optionally, the method further includes receiving third indication information that is used to indicate at least one second geometric shape and that is sent by the server, where the second geometric shape is generated by the server according to at least one third image unit, one third image unit corresponds to one second geometric shape, a similarity between a third image unit and a corresponding second geometric shape is greater than or equal to the similarity threshold, the third image unit is determined by the server according to the first image, the geometric shape set, and the similarity threshold, and a similarity between a third image unit and each geometric shape in the geometric shape set is less than the similarity threshold; and determining the second geometric shape according to the third indication information; and the reconstructing the first image according to the first geometric shape includes reconstructing the first image according to the first geometric shape and the second geometric shape.

Optionally, the server and the decoding-side device store mapping relationship information, and the mapping relationship information is used to indicate one-to-one correspondences between multiple geometric shapes and multiple index values; and the first indication information is an index value corresponding to the first geometric shape.

Optionally, the server sends the mapping relationship information to the decoding-side device.

Optionally, a second image and the first image belong to a same video.

Operations of the decoding-side device in the method 300 are similar to operations of the decoding-side device in the method 200, operations of the server in the method 300 are similar to operations of the server in the method 200, and herein, operations of the encoding-side device in the method 300 are similar to operations of the encoding-side device in the method 200. Herein, a detailed description thereof is omitted to avoid repetition.

In the image processing method according to this embodiment of the disclosure, the server divides the first image obtained from the encoding-side device into multiple image units, and sends indication information of the first geometric shape whose similarity with the first image unit is greater than or equal to the preset similarity threshold to the decoding-side device. In this way, the decoding-side device can reconstruct the first image according to the first geometric shape, the encoding-side device does not need to perform complex processing such as image compression, and processing complexity of the encoding-side device and a requirement on processing performance of the encoding-side device can be reduced.

FIG. 4 is a schematic flowchart of an image processing method 400 according to another embodiment of the disclosure from the perspective of an encoding-side device. As shown in FIG. 4, the method 400 includes the following steps.

S410: An encoding-side device receives first indication information that is used to indicate at least one first geometric shape and that is sent by a server, where the first geometric shape is determined by the server in a preset geometric shape set according to a first image, the geometric shape set, and a preset similarity threshold, the first image includes at least one first image unit, one first image unit corresponds to one first geometric shape, and a similarity between a first image unit and a corresponding first geometric shape is greater than or equal to the similarity threshold.

S420: Determine the first geometric shape according to the first indication information.

S430: Determine at least one target first geometric shape in the first geometric shape according to the first geometric shape, a second image, and the similarity threshold, and determine at least one second image unit in the second image, where one second image unit corresponds to one target first geometric shape, and a similarity between a second image unit and a corresponding target first geometric shape is greater than or equal to the similarity threshold.

S440: Generate second indication information used to indicate the target first geometric shape.

S450: Send the second indication information to a decoding-side device.

Optionally, the method further includes receiving third indication information that is used to indicate at least one second geometric shape and that is sent by the server, where the second geometric shape is generated by the server according to at least one third image unit, one third image unit corresponds to one second geometric shape, a similarity between a third image unit and a corresponding second geometric shape is greater than or equal to the similarity threshold, the third image unit is determined by the server according to the first image, the geometric shape set, and the similarity threshold, and a similarity between a third image unit and each geometric shape in the geometric shape set is less than the similarity threshold; determining the second geometric shape according to the third indication information; determining at least one target second geometric shape in the second geometric shape according to the second geometric shape, a fourth image, and the similarity threshold, and determining at least one fourth image unit in the fourth image, generating fourth indication information used to indicate the target second geometric shape, and sending the fourth indication information to the decoding-side device, where one fourth image unit corresponds to one target second geometric shape, and a similarity between a fourth image unit and a corresponding target second geometric shape is greater than or equal to the similarity threshold; generating fourth indication information used to indicate the target second geometric shape; and sending the fourth indication information to the decoding-side device.

Optionally, the server and the encoding-side device store mapping relationship information, and the mapping relationship information is used to indicate one-to-one correspondences between multiple geometric shapes and multiple index values; and the first indication information is an index value corresponding to the first geometric shape.

Optionally, the server sends the mapping relationship information to the encoding-side device.

Optionally, the second image and the first image belong to a same video.

Operations of the decoding-side device in the method 400 are similar to operations of the decoding-side device in the method 200, operations of the server in the method 400 are similar to operations of the server in the method 200, and herein, operations of the encoding-side device in the method 400 are similar to operations of the encoding-side device in the method 200. Herein, a detailed description thereof is omitted to avoid repetition.

In the image processing method according to this embodiment of the disclosure, the server divides the first image obtained from the encoding-side device into multiple image units, and sends the indication information of the first geometric shape whose similarity with the first image unit is greater than or equal to the preset similarity threshold to the encoding-side device. In this way, the encoding-side device can divide the second image into multiple image units according to the first geometric shape, and send the indication information of the target first geometric shape whose similarity with the second image unit is greater than or equal to the preset similarity threshold to the decoding-side device. In this way, the decoding-side device can reconstruct the first image based on the target first geometric shape, the encoding-side device does not need to perform complex processing such as image compression, and processing complexity of the encoding-side device and a requirement on processing performance of the encoding-side device can be reduced.

The image processing methods according to the embodiments of the disclosure are described above in detail with reference to FIG. 1 to FIG. 4. Image processing apparatuses according to the embodiments of the disclosure are described below in detail with reference to FIG. 5 to FIG. 7.

FIG. 5 is a schematic block diagram of an image processing apparatus 500 according to an embodiment of the disclosure. As shown in FIG. 5, the apparatus 500 includes a determining unit 510 configured to determine at least one first geometric shape in a preset geometric shape set according to a first image, the geometric shape set, and a preset similarity threshold, and determine at least one first image unit in the first image, where one first image unit corresponds to one first geometric shape, and a similarity between a first image unit and a corresponding first geometric shape is greater than or equal to the similarity threshold; a generation unit 520 configured to generate first indication information used to indicate the first geometric shape; and a sending unit 530 configured to send the first indication information to a decoding-side device.

Optionally, the sending unit is further configured to send the first indication information to an encoding-side device, so that the encoding-side device determines at least one target first geometric shape in the first geometric shape according to the first geometric shape, a second image, and the similarity threshold, determines at least one second image unit in the second image, generates second indication information used to indicate the target first geometric shape, and sends the second indication information to the decoding-side device, where one second image unit corresponds to one target first geometric shape, and a similarity between a second image unit and a corresponding target first geometric shape is greater than or equal to the similarity threshold.

Optionally, the determining unit is further configured to determine at least one third image unit in the first image according to the first image, the geometric shape set, and the similarity threshold, where a similarity between a third image unit and each geometric shape in the geometric shape set is less than the similarity threshold; the generation unit is further configured to generate at least one second geometric shape according to the third image unit, and generate third indication information used to indicate the second geometric shape, where one third image unit corresponds to one second geometric shape, and a similarity between a third image unit and a corresponding second geometric shape is greater than or equal to the similarity threshold; and the sending unit is further configured to send the third indication information to the decoding-side device.

Optionally, the sending unit is further configured to send the third indication information to the encoding-side device, so that the encoding-side device determines at least one target second geometric shape in the second geometric shape according to the second geometric shape, a fourth image, and the similarity threshold, determines at least one fourth image unit in the fourth image, generates fourth indication information used to indicate the target second geometric shape, and sends the fourth indication information to the decoding-side device, where one fourth image unit corresponds to one target second geometric shape, and a similarity between a fourth image unit and a corresponding target second geometric shape is greater than or equal to the similarity threshold.

The image processing apparatus 500 according to this embodiment of the disclosure may correspond to the server in the methods in the embodiments of the disclosure, and units, that is, modules in the image processing apparatus 500, and the foregoing other operations and/or functions are separately for implementing corresponding procedures in the method 200 in FIG. 2. Details are not provided herein again for brevity.

In the image processing apparatus according to this embodiment of the disclosure, the server divides the first image obtained from the encoding-side device into multiple image units, and sends indication information of the first geometric shape whose similarity with the first image unit is greater than or equal to the preset similarity threshold to the decoding-side device. In this way, the decoding-side device can reconstruct the first image according to the first geometric shape, the encoding-side device does not need to perform complex processing such as image compression, and processing complexity of the encoding-side device and a requirement on processing performance of the encoding-side device can be reduced.

Figure 6:
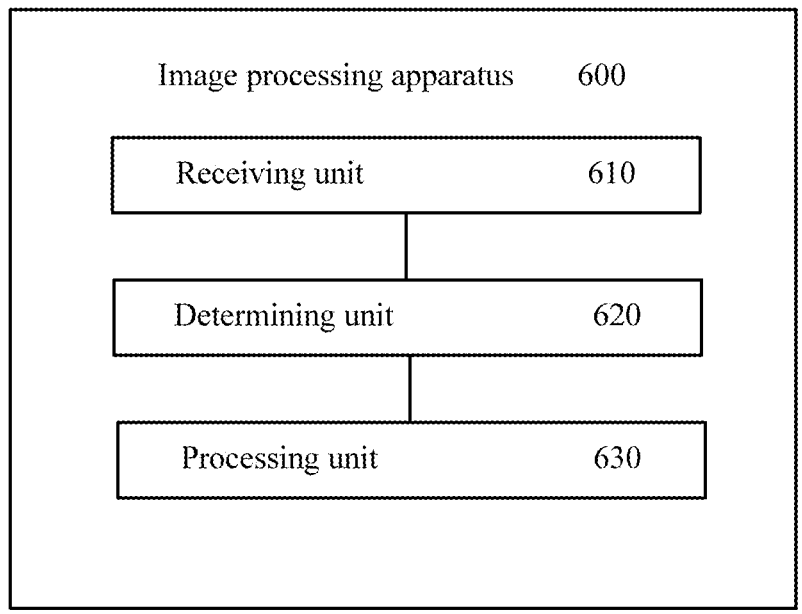
FIG. 6 is a schematic block diagram of an image processing apparatus according to another embodiment of the disclosure.

FIG. 6 is a schematic block diagram of an image processing apparatus 600 according to an embodiment of the disclosure. As shown in FIG. 6, the apparatus 600 includes the following steps.

a receiving unit 610 configured to receive first indication information that is used to indicate at least one first geometric shape and that is sent by a server, where the first geometric shape is determined by the server in a preset geometric shape set according to a first image, the geometric shape set, and a preset similarity threshold, the first image includes at least one first image unit, one first image unit corresponds to one first geometric shape, and a similarity between a first image unit and a corresponding first geometric shape is greater than or equal to the similarity threshold; a determining unit 620 configured to determine the first geometric shape according to the first indication information; and a processing unit 630 configured to reconstruct the first image according to the first geometric shape.

Optionally, the receiving unit is further configured to receive third indication information that is used to indicate at least one second geometric shape and that is sent by the server, where the second geometric shape is generated by the server according to at least one third image unit, one third image unit corresponds to one second geometric shape, a similarity between a third image unit and a corresponding second geometric shape is greater than or equal to the similarity threshold, the third image unit is determined by the server according to the first image, the geometric shape set, and the similarity threshold, and a similarity between a third image unit and each geometric shape in the geometric shape set is less than the similarity threshold; the determining unit is further configured to determine the second geometric shape according to the third indication information; and the processing unit reconstructs the first image according to the first geometric shape and the second geometric shape.

Optionally, the server and the apparatus store mapping relationship information, and the mapping relationship information is used to indicate one-to-one correspondences between multiple geometric shapes and multiple index values; and the first indication information is an index value corresponding to the first geometric shape.

Optionally, the server sends the mapping relationship information to the apparatus.

The image processing apparatus 600 according to this embodiment of the disclosure may correspond to the decoding-side device in the methods in the embodiments of the disclosure, and units, that is, modules in the image processing apparatus 600, and the foregoing other operations and/or functions are separately for implementing corresponding procedures in the method 300 in FIG. 3. Details are not provided herein again for brevity.

In the image processing apparatus according to this embodiment of the disclosure, the server divides the first image obtained from the encoding-side device into multiple image units, and sends indication information of the first geometric shape whose similarity with the first image unit is greater than or equal to the preset similarity threshold to the decoding-side device. In this way, the decoding-side device can reconstruct the first image according to the first geometric shape, the encoding-side device does not need to perform complex processing such as image compression, and processing complexity of the encoding-side device and a requirement on processing performance of the encoding-side device can be reduced.

Figure 7:
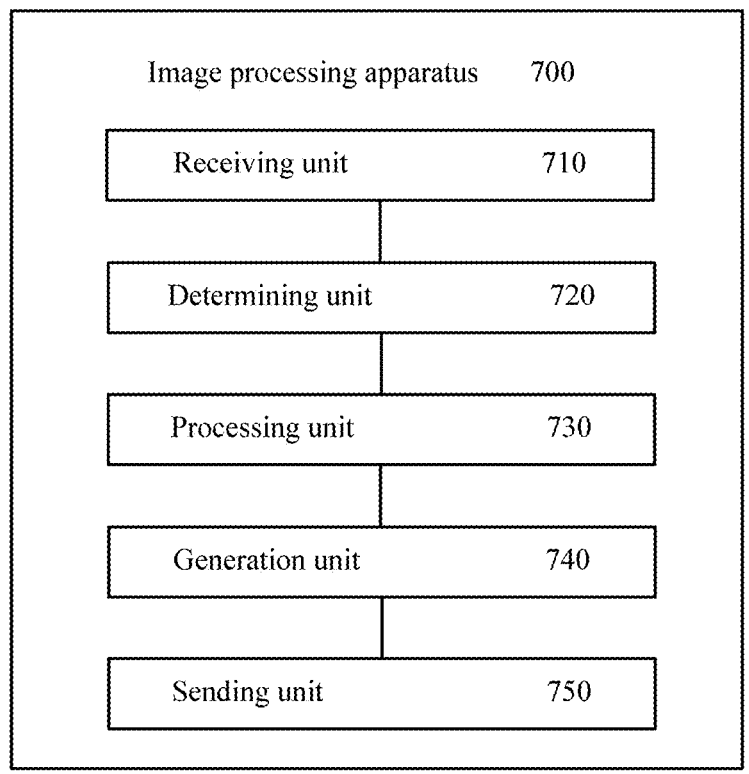
FIG. 7 is a schematic block diagram of an image processing apparatus according to another embodiment of the disclosure.

FIG. 7 is a schematic block diagram of an image processing apparatus 700 according to an embodiment of the disclosure. As shown in FIG. 7, the apparatus 700 includes a receiving unit 710 configured to receive first indication information that is used to indicate at least one first geometric shape and that is sent by a server, where the first geometric shape is determined by the server in a preset geometric shape set according to a first image, the geometric shape set, and a preset similarity threshold, the first image includes at least one first image unit, one first image unit corresponds to one first geometric shape, and a similarity between a first image unit and a corresponding first geometric shape is greater than or equal to the similarity threshold; a determining unit 720 configured to determine the first geometric shape according to the first indication information; a processing unit 730 configured to determine at least one target first geometric shape in the first geometric shape according to the first geometric shape, a second image, and the similarity threshold, and determine at least one second image unit in the second image, where one second image unit corresponds to one target first geometric shape, and a similarity between a second image unit and a corresponding target first geometric shape is greater than or equal to the similarity threshold; a generation unit 740 configured to generate second indication information used to indicate the target first geometric shape; and a sending unit 750 configured to send the second indication information to a decoding-side device.

Optionally, the receiving unit is further configured to receive third indication information that is used to indicate at least one second geometric shape and that is sent by the server, where the second geometric shape is generated by the server according to at least one third image unit, one third image unit corresponds to one second geometric shape, a similarity between a third image unit and a corresponding second geometric shape is greater than or equal to the similarity threshold, the third image unit is determined by the server according to the first image, the geometric shape set, and the similarity threshold, and a similarity between a third image unit and each geometric shape in the geometric shape set is less than the similarity threshold; the determining unit is further configured to determine the second geometric shape according to the third indication information; the processing unit is further configured to determine at least one target second geometric shape in the second geometric shape according to the second geometric shape, a fourth image, and the similarity threshold, and determine at least one fourth image unit in the fourth image, generate fourth indication information used to indicate the target second geometric shape, and send the fourth indication information to the decoding-side device, where one fourth image unit corresponds to one target second geometric shape, and a similarity between a fourth image unit and a corresponding target second geometric shape is greater than or equal to the similarity threshold; the generation unit is further configured to generate fourth indication information used to indicate the target second geometric shape; and the sending unit is further configured to send the fourth indication information to the decoding-side device.

Optionally, the server and the apparatus store mapping relationship information, and the mapping relationship information is used to indicate one-to-one correspondences between multiple geometric shapes and multiple index values; and the first indication information is an index value corresponding to the first geometric shape.

Optionally, the server sends the mapping relationship information to the apparatus.

Optionally, the second image and the first image belong to a same video.

The image processing apparatus 700 according to this embodiment of the disclosure may correspond to the encoding-side device in the methods in the embodiments of the disclosure, and units, that is, modules in the image processing apparatus 700, and the foregoing other operations and/or functions are separately for implementing corresponding procedures in the method 400 in FIG. 4. Details are not provided herein again for brevity.

In the image processing apparatus according to this embodiment of the disclosure, the server divides the first image obtained from the encoding-side device into multiple image units, and sends the indication information of the first geometric shape whose similarity with the first image unit is greater than or equal to the preset similarity threshold to the encoding-side device. In this way, the encoding-side device can divide the second image into multiple image units according to the first geometric shape, and send the indication information of the target first geometric shape whose similarity with the second image unit is greater than or equal to the preset similarity threshold to the decoding-side device. In this way, the decoding-side device can reconstruct the first image based on the target first geometric shape, the encoding-side device does not need to perform complex processing such as image compression, and processing complexity of the encoding-side device and a requirement on processing performance of the encoding-side device can be reduced.

The image processing methods according to the embodiments of the disclosure are described above in detail with reference to FIG. 1 to FIG. 4. Image processing devices according to the embodiments of the disclosure are described below in detail with reference to FIG. 8 to FIG. 10.

Figure 8:
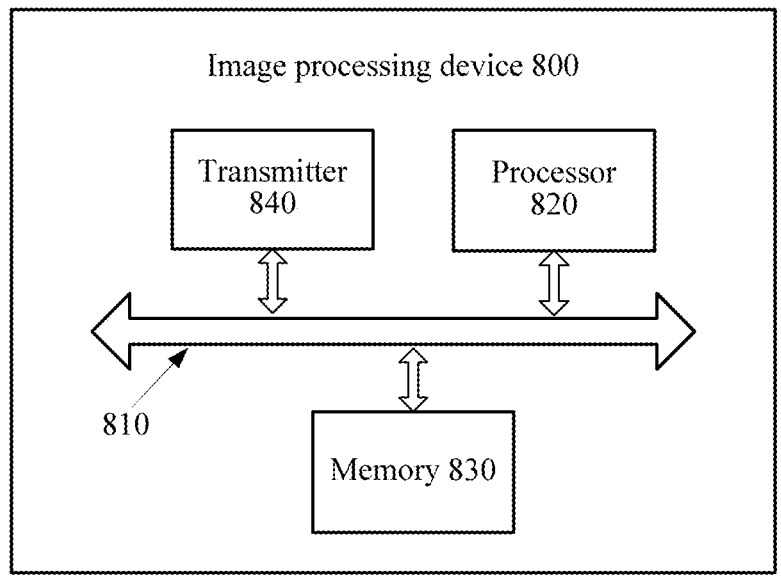
FIG. 8 is a schematic structural diagram of an image processing device according to an embodiment of the disclosure.

FIG. 8 is a schematic block diagram of an image processing device 800 according to an embodiment of the disclosure. As shown in FIG. 8, the device 800 includes a bus 810; a processor 820 connected to the bus; a memory 830 connected to the bus; and a transmitter 840 connected to the bus, where the processor 820 invokes, by using the bus 810, a program stored in the memory 830, to determine at least one first geometric shape in a preset geometric shape set according to a first image, the geometric shape set, and a preset similarity threshold, and determine at least one first image unit in the first image, where one first image unit corresponds to one first geometric shape, and a similarity between a first image unit and a corresponding first geometric shape is greater than or equal to the similarity threshold; generate first indication information used to indicate the first geometric shape; and control the transmitter 840 to send the first indication information to a decoding-side device.

Optionally, the processor is further configured to send the first indication information to an encoding-side device, so that the encoding-side device determines at least one target first geometric shape in the first geometric shape according to the first geometric shape, a second image, and the similarity threshold, determines at least one second image unit in the second image, generates second indication information used to indicate the target first geometric shape, and sends the second indication information to the decoding-side device, where one second image unit corresponds to one target first geometric shape, and a similarity between a second image unit and a corresponding target first geometric shape is greater than or equal to the similarity threshold.

Optionally, the processor is further configured to determine at least one third image unit in the first image according to the first image, the geometric shape set, and the similarity threshold, where a similarity between a third image unit and each geometric shape in the geometric shape set is less than the similarity threshold; generate at least one second geometric shape according to the third image unit, where one third image unit corresponds to one second geometric shape, and a similarity between a third image unit and a corresponding second geometric shape is greater than or equal to the similarity threshold; generate third indication information used to indicate the second geometric shape; and control the transmitter to send the third indication information to the decoding-side device.

Optionally, the processor is further configured to control the transmitter to send the third indication information to the encoding-side device, so that the encoding-side device determines at least one target second geometric shape in the second geometric shape according to the second geometric shape, a fourth image, and the similarity threshold, determines at least one fourth image unit in the fourth image, generates fourth indication information used to indicate the target second geometric shape, and sends the fourth indication information to the decoding-side device, where one fourth image unit corresponds to one target second geometric shape, and a similarity between a fourth image unit and a corresponding target second geometric shape is greater than or equal to the similarity threshold.

Optionally, the second image and the first image belong to a same video.

Optionally, the device 800, the decoding-side device, and the encoding-side device store mapping relationship information, the mapping relationship information is used to indicate one-to-one correspondences between multiple geometric shapes and multiple index values, and the first geometric shape belongs to the multiple geometric shapes; and the first indication information is an index value corresponding to the first geometric shape.

This embodiment of the disclosure can be applied to various communications devices.

The transmitter 840 of the device 800 may include a transmitter circuit, a power controller, an encoder, and an antenna. In addition, the device 800 may further include a receiver. The receiver may include a receiver circuit, a power controller, a decoder, and an antenna.

The processor may also be referred to as a central processing unit (CPU). The memory may include a read-only memory and a random access memory, and provide an instruction and data to the processor. A part of the memory may further include a non-volatile random access memory (NVRAM). During specific application, the device 800 may be built in or may be a communications device such as a server, and may further include a carrier that accommodates the transmitter circuit and the receiver circuit, to allow the device 800 to transmit data to or receive data from a remote location. The transmitter circuit and the receiver circuit may be coupled to the antennas. The various components of the device 800 are coupled by using the bus, and the bus further includes a power supply bus, a control bus, and a status signal bus in addition to a data bus. However, for the purpose of clarity, various buses are all marked as a bus in the figure. In different specific products, the decoder may be integrated with a processing unit.

The processor may implement or execute steps and logical block diagrams disclosed in the method embodiments of the disclosure. A general-purpose processor may be a microprocessor or the processor may be any conventional processor, a decoder, or the like. Steps of the method disclosed with reference to the embodiments of the disclosure may be directly executed by a hardware processor, or may be executed by a combination of hardware and software modules in a decoding processor. The software module may be located in a mature storage medium in the art such as a random access memory, a flash memory, a read-only memory, a programmable read-only memory, an electrically erasable programmable memory, or a register.

It should be understood that, in this embodiment of the disclosure, the processor may be a CPU. The processor may alternatively be another general-purpose processor, a digital signal processor (DSP), an application-specific integrated circuit (ASIC), a field programmable gate array (FPGA) or another programmable logic device, a discrete gate or transistor logic device, a discrete hardware component, or the like. A general-purpose processor may be a microprocessor or the processor may be any conventional processor or the like.

The memory may include a read-only memory (ROM) and a random access memory (RAM), and provide an instruction and data to the processor. A part of the memory may further include a non-volatile random access memory. For example, the memory may further store device type information.

The bus system may further include a power supply bus, a control bus, a status signal bus, and the like in addition to a data bus. However, for the purpose of clarity, various buses are all marked as a bus system in the figure.

In an implementation process, steps of the method may be executed by a hardware integrated logic circuit in the processor or an instruction in a form of software. Steps of the method disclosed with reference to the embodiments of the disclosure may be directly executed by a hardware processor, or may be executed by a combination of hardware and software modules in the processor. The software module may be located in a mature storage medium in the art such as a random access memory, a flash memory, a read-only memory, a programmable read-only memory, an electrically erasable programmable memory, or a register. The storage medium is located in the memory, and the processor reads information in the memory and executes steps in the methods in combination with hardware thereof. Details are not provided herein again to avoid repetition.

The image processing device 800 according to this embodiment of the disclosure may correspond to the server in the methods in the embodiments of the disclosure, and units, that is, modules in the image processing device 800, and the foregoing other operations and/or functions are separately for implementing corresponding procedures in the method 200 in FIG. 2. Details are not provided herein again for brevity.

In the image processing device according to this embodiment of the disclosure, the server divides the first image obtained from the encoding-side device into multiple image units, and sends indication information of the first geometric shape whose similarity with the first image unit is greater than or equal to the preset similarity threshold to the decoding-side device. In this way, the decoding-side device can reconstruct the first image according to the first geometric shape, the encoding-side device does not need to perform complex processing such as image compression, and processing complexity of the encoding-side device and a requirement on processing performance of the encoding-side device can be reduced.

Figure 9:
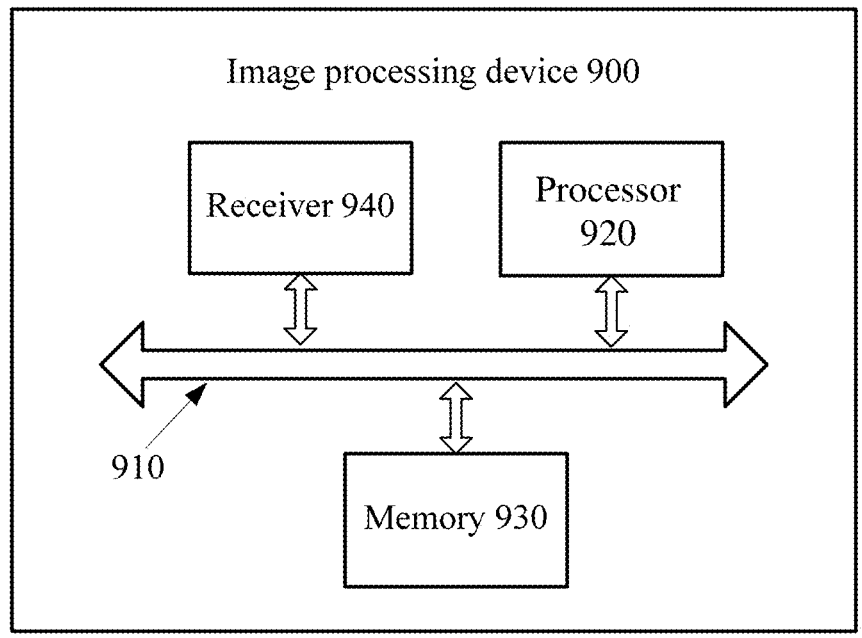
FIG. 9 is a schematic structural diagram of an image processing device according to another embodiment of the disclosure.

FIG. 9 is a schematic block diagram of an image processing device 900 according to an embodiment of the disclosure. As shown in FIG. 9, the device 900 includes a bus 910; a processor 920 connected to the bus; a memory 930 connected to the bus; and a receiver 940 connected to the bus, where the processor invokes, by using the bus, a program stored in the memory, to be configured to control the receiver 940 to receive first indication information that is used to indicate at least one first geometric shape and that is sent by a server, where the first geometric shape is determined by the server in a preset geometric shape set according to a first image, the geometric shape set, and a preset similarity threshold, the first image includes at least one first image unit, one first image unit corresponds to one first geometric shape, and a similarity between a first image unit and a corresponding first geometric shape is greater than or equal to the similarity threshold; determine the first geometric shape according to the first indication information; and reconstruct the first image according to the first geometric shape.

Optionally, the server and the device 900 store mapping relationship information, and the mapping relationship information is used to indicate one-to-one correspondences between multiple geometric shapes and multiple index values; and the first indication information is an index value corresponding to the first geometric shape.

Optionally, the server sends the mapping relationship information to the device 900.

Optionally, the processor is further configured to control the receiver to receive third indication information that is used to indicate at least one second geometric shape and that is sent by the server, where the second geometric shape is generated by the server according to at least one third image unit, one third image unit corresponds to one second geometric shape, a similarity between a third image unit and a corresponding second geometric shape is greater than or equal to the similarity threshold, the third image unit is determined by the server according to the first image, the geometric shape set, and the similarity threshold, and a similarity between a third image unit and each geometric shape in the geometric shape set is less than the similarity threshold; and determine the second geometric shape according to the third indication information; and the reconstructing the first image according to the first geometric shape includes reconstructing the first image according to the first geometric shape and the second geometric shape.

This embodiment of the disclosure can be applied to various communications devices.

The receiver of the device 900 may include a receiver circuit, a power controller, a decoder, and an antenna. In addition, the device 900 may further include a transmitter. The transmitter may include a receiver circuit, a power controller, an encoder, and an antenna.

The processor may also be referred to as a CPU. The memory may include a ROM and a RAM, and provide an instruction and data to the processor. A part of the memory may further include an NVRAM. During specific application, the device 900 may be built in or may be a communications device such as a terminal device, and may further include a carrier that accommodates the transmitter circuit and the receiver circuit, to allow the device 900 to transmit data to or receive data from a remote location. The transmitter circuit and the receiver circuit may be coupled to the antennas. The various components of the device 900 are coupled by using the bus, and the bus further includes a power supply bus, a control bus, and a status signal bus in addition to a data bus. However, for the purpose of clarity, various buses are all marked as a bus in the figure. In different specific products, the decoder may be integrated with a processing unit.

The processor may implement or execute steps and logical block diagrams disclosed in the method embodiments of the disclosure. A general-purpose processor may be a microprocessor or the processor may be any conventional processor, a decoder, or the like. Steps of the method disclosed with reference to the embodiments of the disclosure may be directly executed by a hardware processor, or may be executed by a combination of hardware and software modules in a decoding processor. The software module may be located in a mature storage medium in the art such as a random access memory, a flash memory, a read-only memory, a programmable read-only memory, an electrically erasable programmable memory, or a register.

It should be understood that, in this embodiment of the disclosure, the processor may be a CPU. The processor may alternatively be another general-purpose processor, a DSP, an ASIC, a FPGA or another programmable logic device, a discrete gate or transistor logic device, a discrete hardware component, or the like. A general-purpose processor may be a microprocessor or the processor may be any conventional processor or the like.

The memory may include a ROM and a RAM, and provide an instruction and data to the processor. A part of the memory may further include a non-volatile random access memory. For example, the memory may further store device type information.

The bus system may further include a power supply bus, a control bus, a status signal bus, and the like in addition to a data bus. However, for the purpose of clarity, various buses are all marked as a bus system in the figure.

In an implementation process, steps of the method may be executed by a hardware integrated logic circuit in the processor or an instruction in a form of software. Steps of the method disclosed with reference to the embodiments of the disclosure may be directly executed by a hardware processor, or may be executed by a combination of hardware and software modules in the processor. The software module may be located in a mature storage medium in the art such as a RAM, a flash memory, a ROM, a programmable ROM, an EEPROM, or a register. The storage medium is located in the memory, and the processor reads information in the memory and executes steps in the methods in combination with hardware thereof. Details are not provided herein again to avoid repetition.

The image processing device 900 according to this embodiment of the disclosure may correspond to the decoding-side device in the methods in the embodiments of the disclosure, and units, that is, modules in the image processing device 900, and the foregoing other operations and/or functions are separately for implementing corresponding procedures in the method 300 in FIG. 3. Details are not provided herein again for brevity.

In the image processing device according to this embodiment of the disclosure, the server divides the first image obtained from the encoding-side device into multiple image units, and sends indication information of the first geometric shape whose similarity with the first image unit is greater than or equal to the preset similarity threshold to the decoding-side device. In this way, the decoding-side device can reconstruct the first image according to the first geometric shape, the encoding-side device does not need to perform complex processing such as image compression, and processing complexity of the encoding-side device and a requirement on processing performance of the encoding-side device can be reduced.

Figure 10:
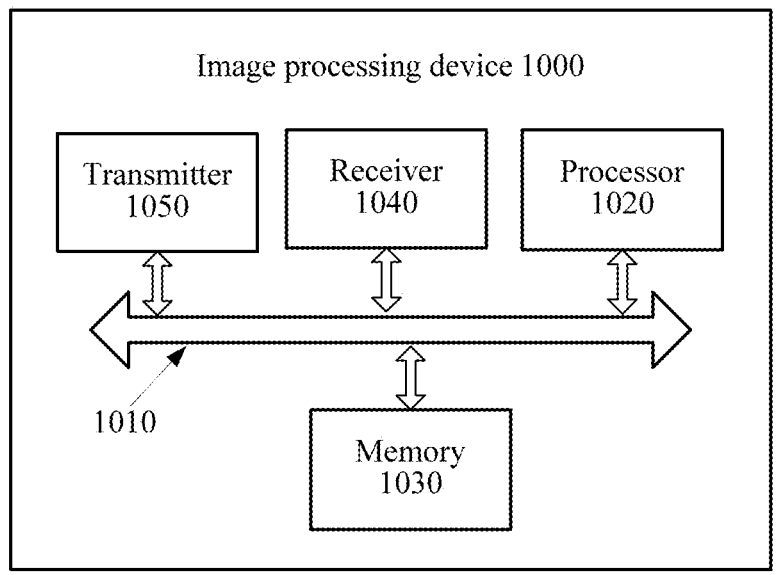
FIG. 10 is a schematic structural diagram of an image processing device according to another embodiment of the disclosure.

FIG. 10 is a schematic block diagram of an image processing device 1000 according to an embodiment of the disclosure. As shown in FIG. 10, the device 1000 includes a bus 1010; a processor 1020 connected to the bus; a memory 1030 connected to the bus; a receiver 1040 connected to the bus, and a transmitter 1050 connected to the bus, where the processor invokes, by using the bus, a program stored in the memory, to be configured to control the receiver 1040 to receive first indication information that is used to indicate at least one first geometric shape and that is sent by a server, where the first geometric shape is determined by the server in a preset geometric shape set according to a first image, the geometric shape set, and a preset similarity threshold, the first image includes at least one first image unit, one first image unit corresponds to one first geometric shape, and a similarity between a first image unit and a corresponding first geometric shape is greater than or equal to the similarity threshold; determine the first geometric shape according to the first indication information; determine at least one target first geometric shape in the first geometric shape according to the first geometric shape, a second image, and the similarity threshold, and determine at least one second image unit in the second image, where one second image unit corresponds to one target first geometric shape, and a similarity between a second image unit and a corresponding target first geometric shape is greater than or equal to the similarity threshold; generate second indication information used to indicate the target first geometric shape; and control the transmitter 1050 to send the second indication information to the decoding-side device.

Optionally, the server and the device 1000 store mapping relationship information, and the mapping relationship information is used to indicate one-to-one correspondences between multiple geometric shapes and multiple index values; and the first indication information is an index value corresponding to the first geometric shape.

Optionally, the server sends the mapping relationship information to the device 1000.

Optionally, the processor is further configured to control the receiver to receive third indication information that is used to indicate at least one second geometric shape and that is sent by the server, where the second geometric shape is generated by the server according to at least one third image unit, one third image unit corresponds to one second geometric shape, a similarity between a third image unit and a corresponding second geometric shape is greater than or equal to the similarity threshold, the third image unit is determined by the server according to the first image, the geometric shape set, and the similarity threshold, and a similarity between a third image unit and each geometric shape in the geometric shape set is less than the similarity threshold; determine the second geometric shape according to the third indication information; determine at least one target second geometric shape in the second geometric shape according to the second geometric shape, a fourth image, and the similarity threshold, determine at least one fourth image unit in the fourth image, generate fourth indication information used to indicate the target second geometric shape, and send the fourth indication information to the decoding-side device, where one fourth image unit corresponds to one target second geometric shape, and a similarity between a fourth image unit and a corresponding target second geometric shape is greater than or equal to the similarity threshold; generate fourth indication information used to indicate the target second geometric shape; and control the transmitter to send the fourth indication information to the decoding-side device.

Optionally, the second image and the first image belong to a same video.

This embodiment of the disclosure can be applied to various communications devices.

The transmitter of the device 1000 may include a transmitter circuit, a power controller, an encoder, and an antenna. In addition, the receiver of the device 1000 may include a receiver circuit, a power controller, a decoder, and an antenna.

The processor may also be referred to as a CPU. The memory may include a ROM and a RAM, and provide an instruction and data to the processor. A part of the memory may further include a NVRAM. During specific application, the device 1000 may be built in or may be a communications device such as a terminal device, and may further include a carrier that accommodates the transmitter circuit and the receiver circuit, to allow the device 1000 to transmit data to or receive data from a remote location. The transmitter circuit and the receiver circuit may be coupled to the antennas. The various components of the device 1000 are coupled by using the bus, and the bus further includes a power supply bus, a control bus, and a status signal bus in addition to a data bus. However, for the purpose of clarity, various buses are all marked as a bus in the figure. In different specific products, the decoder may be integrated with a processing unit.

The processor may implement or execute steps and logical block diagrams disclosed in the method embodiments of the disclosure. A general-purpose processor may be a microprocessor or the processor may be any conventional processor, a decoder, or the like. Steps of the method disclosed with reference to the embodiments of the disclosure may be directly executed by a hardware processor, or may be executed by a combination of hardware and software modules in a decoding processor. The software module may be located in a mature storage medium in the art such as a random access memory, a flash memory, a read-only memory, a programmable read-only memory, an electrically erasable programmable memory, or a register.

It should be understood that, in this embodiment of the disclosure, the processor may be a CPU. The processor may alternatively be another general-purpose processor, a DSP, an ASIC, a FPGA or another programmable logic device, a discrete gate or transistor logic device, a discrete hardware component, or the like. A general-purpose processor may be a microprocessor or the processor may be any conventional processor or the like.

The memory may include a ROM and a RAM, and provide an instruction and data to the processor. A part of the memory may further include a NVRAM. For example, the memory may further store device type information.

The bus system may further include a power supply bus, a control bus, a status signal bus, and the like in addition to a data bus. However, for the purpose of clarity, various buses are all marked as a bus system in the figure.

In an implementation process, steps of the method may be executed by a hardware integrated logic circuit in the processor or an instruction in a form of software. Steps of the method disclosed with reference to the embodiments of the disclosure may be directly executed by a hardware processor, or may be executed by a combination of hardware and software modules in the processor. The software module may be located in a mature storage medium in the art such as a random access memory, a flash memory, a read-only memory, a programmable read-only memory, an electrically erasable programmable memory, or a register. The storage medium is located in the memory, and the processor reads information in the memory and executes steps in the methods in combination with hardware thereof. Details are not provided herein again to avoid repetition.

The image processing device 1000 according to this embodiment of the disclosure may correspond to the encoding-side device in the methods in the embodiments of the disclosure, and units, that is, modules in the image processing device 1000, and the foregoing other operations and/or functions are separately for implementing corresponding procedures in the method 400 in FIG. 4. Details are not provided herein again for brevity.

In the image processing device according to this embodiment of the disclosure, the server divides the first image obtained from the encoding-side device into multiple image units, and sends the indication information of the first geometric shape whose similarity with the first image unit is greater than or equal to the preset similarity threshold to the encoding-side device. In this way, the encoding-side device can divide the second image into multiple image units according to the first geometric shape, and send the indication information of the target first geometric shape whose similarity with the second image unit is greater than or equal to the preset similarity threshold to the decoding-side device. In this way, the decoding-side device can reconstruct the first image based on the target first geometric shape, the encoding-side device does not need to perform complex processing such as image compression, and processing complexity of the encoding-side device and a requirement on processing performance of the encoding-side device can be reduced.

It should be understood that sequence numbers of the foregoing processes do not mean execution sequences in various embodiments of the disclosure. The execution sequences of the processes should be determined according to functions and internal logic of the processes, and should not be construed as any limitation on the implementation processes of the embodiments of the disclosure.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

When the functions are implemented in the form of a software functional unit and sold or used as an independent product, the functions may be stored in a computer-readable storage medium. Based on such an understanding, the technical solutions of the disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the disclosure. The foregoing storage medium includes any medium that can store program code, such as a universal serial bus (USB) flash drive, a removable hard disk, a ROM, a RAM, a magnetic disk, or an optical disc.

The foregoing descriptions are merely specific implementation manners of the disclosure, but are not intended to limit the protection scope of the disclosure. Any variation or replacement readily figured out by a person skilled in the art within the technical scope disclosed in the disclosure shall fall within the protection scope of the disclosure. Therefore, the protection scope of the disclosure shall be subject to the protection scope of the claims.

What is claimed is:

1. An image processing method implemented by a server, comprising:
   determining a first geometric shape in a preset geometric shape set according to each of a first image, the preset geometric shape set, and a preset similarity threshold; and
   determining a first image component in the first image, wherein the first image component corresponds to the first geometric shape, and wherein a similarity between the first image component and the first geometric shape is greater than or equal to the preset similarity threshold;
   generating first indication information that indicates information for the first geometric shape;
   sending the first indication information to a decoding-side device to enable the decoding-side device to reconstruct the first image; and
   sending the first indication information to an encoding-side device to enable the encoding-side device to:
      determine a first target geometric shape according to each of the first geometric shape, a second image, and the preset similarity threshold;
      determine a second image component in the second image; and
      generate second indication information that indicates a first target geometric shape, wherein the second image component corresponds to the first target geometric shape, and wherein a similarity between the second image component and the first target geometric shape is greater than or equal to the preset similarity threshold.

2. The image processing method of claim 1, further comprising determining a third image component in the first image according to each of the first image, the preset geometric shape set, and the preset similarity threshold, wherein a similarity between a third image component and each geometric shape in the preset geometric shape set is less than the preset similarity threshold.

3. An image processing method implemented by a decoding-side device, comprising:
   receiving, from a server, first indication information that indicates a first geometric shape, wherein the first geometric shape is based on a preset geometric shape set that is based on each of a first image, the preset geometric shape set, and a preset similarity threshold, wherein the first image comprises a first image component, wherein the first image component corresponds to the first geometric shape, and wherein a similarity between the first image component and the first geometric shape is greater than or equal to the preset similarity threshold;
   determining the first geometric shape according to the first indication information;
   reconstructing the first image based on the first geometric shape;
   receiving, from the server, second indication information that indicates a second geometric shape, wherein the second geometric shape corresponds to a third image component, wherein the third image component is based on each of the first image, the preset geometric shape set, and a preset similarity threshold, wherein a similarity between the third image component and the second geometric shape is greater than or equal to the preset similarity threshold, and wherein a similarity between the third image component and each geometric shape in the preset geometric shape set is less than the preset similarity threshold; and
   determining the second geometric shape according to the second indication information, wherein reconstructing the first image based on the first geometric shape comprises reconstructing the first image according to the first geometric shape and the second geometric shape.

4. An image processing apparatus, comprising:
   a processor configured to:
      determine a first geometric shape in a preset geometric shape set according to each of a first image, the preset geometric shape set, and a preset similarity threshold;
      determine a first image component in the first image, wherein the first image component corresponds to the first geometric shape, and wherein a similarity between the first image component and the first geometric shape is greater than or equal to the preset similarity threshold; and
      generate first indication information that indicates the first geometric shape;
   a transmitter coupled to the processor and configured to:
      send the first indication information to a decoding-side device; and send the first indication information to an encoding-side device to enable an encoding-side device to:
    determine at least one first target geometric shape in the first geometric shape according to each of the first geometric shape, a second image, and the preset similarity threshold;
    determine a second image component in the second image;
    generate second indication information that indicates a first target geometric shape, wherein the second image component corresponds to the first target geometric shape, and wherein a similarity between the second image component and the first target geometric shape is greater than or equal to the preset similarity threshold.

5. The image processing apparatus of claim 4, wherein the processor is further configured to:
    determine a third image component in the first image according to each of the first image, the preset geometric shape set, and the preset similarity threshold, wherein a similarity between a third image component and each geometric shape in the preset geometric shape set is less than the preset similarity threshold;
    generate at least one second geometric shape according to the third image component; and
    generate third indication information that indicates a second geometric shape of the at least one second geometric shape, wherein the third image component corresponds to the second geometric shape, wherein a similarity between the third image component and a the second geometric shape is greater than or equal to the preset similarity threshold, and wherein the transmitter is further configured to send the third indication information to the decoding-side device.

6. The image processing apparatus of claim 5, wherein the transmitter is further configured to send the third indication information to the encoding-side device to:
    determine at least one second target geometric shape in the second geometric shape according to each of the second geometric shape, a fourth image, and the preset similarity threshold;
    determine a fourth image component in the fourth image;
    generate fourth indication information that indicates a second target geometric shape, wherein the fourth image component corresponds to the second target geometric shape, and wherein a similarity between the fourth image component and the second target geometric shape is greater than or equal to the preset similarity threshold.

7. An image processing apparatus, comprising:
    a receiver configured to receive, from a server, first indication information that indicates a first geometric shape, wherein the first geometric shape is determined from a preset geometric shape set according to each of a first image, the preset geometric shape set, and a preset similarity threshold, wherein the first image comprises a first image component, wherein the first image component corresponds to the first geometric shape, and wherein a similarity between the first image component and the first geometric shape is greater than or equal to the preset similarity threshold;
    a processor coupled to the receiver and configured to:
        determine the first geometric shape according to the first indication information;
        determine at least one first target geometric shape in the first geometric shape according to each of the first geometric shape, a second image, and the preset similarity threshold;
        determine a second image component in the second image, wherein the second image component corresponds to the first target geometric shape, and wherein a similarity between the second image component and the first target geometric shape is greater than or equal to the preset similarity threshold; and
        generate second indication information that indicates the first target geometric shape; and
    a transmitter coupled to the processor and configured to send the second indication information to a decoding-side device.

8. The image processing apparatus of claim 7, wherein the receiver is further configured to receive, from the server, third indication information that indicates a second geometric shape, wherein the second geometric shape is based on a third image component, wherein a similarity between the third image component and the second geometric shape is greater than or equal to the preset similarity threshold.

9. The image processing apparatus of claim 8, wherein the third image component is based on each of the first image, the preset geometric shape set, and the preset similarity threshold, and wherein a similarity between the third image component and each geometric shape in the preset geometric shape set is less than the preset similarity threshold.

10. The image processing apparatus of claim 8, wherein the processor is further configured to:
    determine the second geometric shape according to the third indication information;
    determine a second target geometric shape in the second geometric shape according to each of the second geometric shape, a fourth image, and the preset similarity threshold;
    determine a fourth image component in the fourth image, wherein the fourth image component corresponds to the second target geometric shape;
    generate fourth indication information that indicates a second target geometric shape; and
    send the fourth indication information to the decoding-side device, wherein a similarity between the fourth image component and the second target geometric shape is greater than or equal to the preset similarity threshold.

11. The image processing apparatus of claim 10, wherein the transmitter is further configured to send the fourth indication information to the decoding-side device.

12. The image processing method of claim 2, further comprising generating a second geometric shape according to the third image component, wherein the third image component corresponds to the second geometric shape, wherein a similarity between the third image component and the second geometric shape is greater than or equal to the preset similarity threshold.

13. The image processing method of claim 12, further comprising sending the third indication information to the encoding-side device to enable the encoding-side device to:
    determine a second target geometric shape according to each of the second geometric shape, a fourth image, and the preset similarity threshold;
    determine a fourth image component in the fourth image; and
    generate fourth indication information that indicates the second target geometric shape, wherein the fourth image component corresponds to the second target geometric shape, and wherein a similarity between the fourth image component and the second target geometric shape is greater than or equal to the preset similarity threshold.

14. The image processing method of claim 13, further comprising:
   generating third indication information that indicates the second geometric shape; and
   sending the third indication information to the decoding-side device.

* * * * *